United States Patent
Everett

(10) Patent No.: US 6,701,162 B1
(45) Date of Patent: Mar. 2, 2004

(54) PORTABLE ELECTRONIC TELECOMMUNICATION DEVICE HAVING CAPABILITIES FOR THE HEARING-IMPAIRED

(75) Inventor: Brandon Christopher Everett, Lawrenceville, GA (US)

(73) Assignee: Motorola, Inc., Schaumburg, IL (US)

( * ) Notice: Subject to any disclaimer, the term of this patent is extended or adjusted under 35 U.S.C. 154(b) by 413 days.

(21) Appl. No.: 09/653,109

(22) Filed: Aug. 31, 2000

(51) Int. Cl.[7] .............................................. H04M 11/00
(52) U.S. Cl. ............................... 455/556.1; 455/556.2; 455/557; 704/235; 704/271
(58) Field of Search ................................. 455/556, 575, 455/550, 458, 414, 90, 556.1, 556.2, 566, 569.1, 557, 550.1, 563; 704/235, 220; 379/52, 88.01

(56) References Cited

U.S. PATENT DOCUMENTS

| | | | | |
|---|---|---|---|---|
| 5,475,798 A | * | 12/1995 | Handlos | 395/2.86 |
| 6,240,392 B1 | * | 5/2001 | Butnaru | 704/271 |
| 6,304,844 B1 | * | 10/2001 | Pan | 704/257 |
| 6,366,882 B1 | * | 4/2002 | Bijl | 704/235 |
| 6,424,845 B1 | * | 7/2002 | Emmoft | 455/575 |
| 6,434,403 B1 | * | 8/2002 | Ausems | 455/556 |
| 6,463,413 B1 | * | 10/2002 | Applebaum | 704/256 |
| 6,501,751 B1 | * | 12/2002 | Leviton | 370/352 |
| 6,546,082 B1 | * | 4/2003 | Alcendor | 379/52 |

* cited by examiner

Primary Examiner—William Trost
Assistant Examiner—Brandon Miller
(74) Attorney, Agent, or Firm—Philip H. Burrus, IV

(57) ABSTRACT

This invention includes a portable electronic device having telecommunication capabilities for use by a hearing-impaired user. The device includes a computer platform having storage for one or more programs, a display for displaying at least alphanumeric text, and at least a speech recognition program that is resident and selectively executable on the computer platform. When a communication connection is established with a communicating party, the speech recognition program translates the words of the calling party into equivalent text and displays the text on the display. The device can also include a text-to-speech program that translates text input by the user of the device into synthetic speech for transmission from the device to the communicating party. A preferred electronic device is a cellular telephone with an electronic organizer being the computer platform.

6 Claims, 3 Drawing Sheets

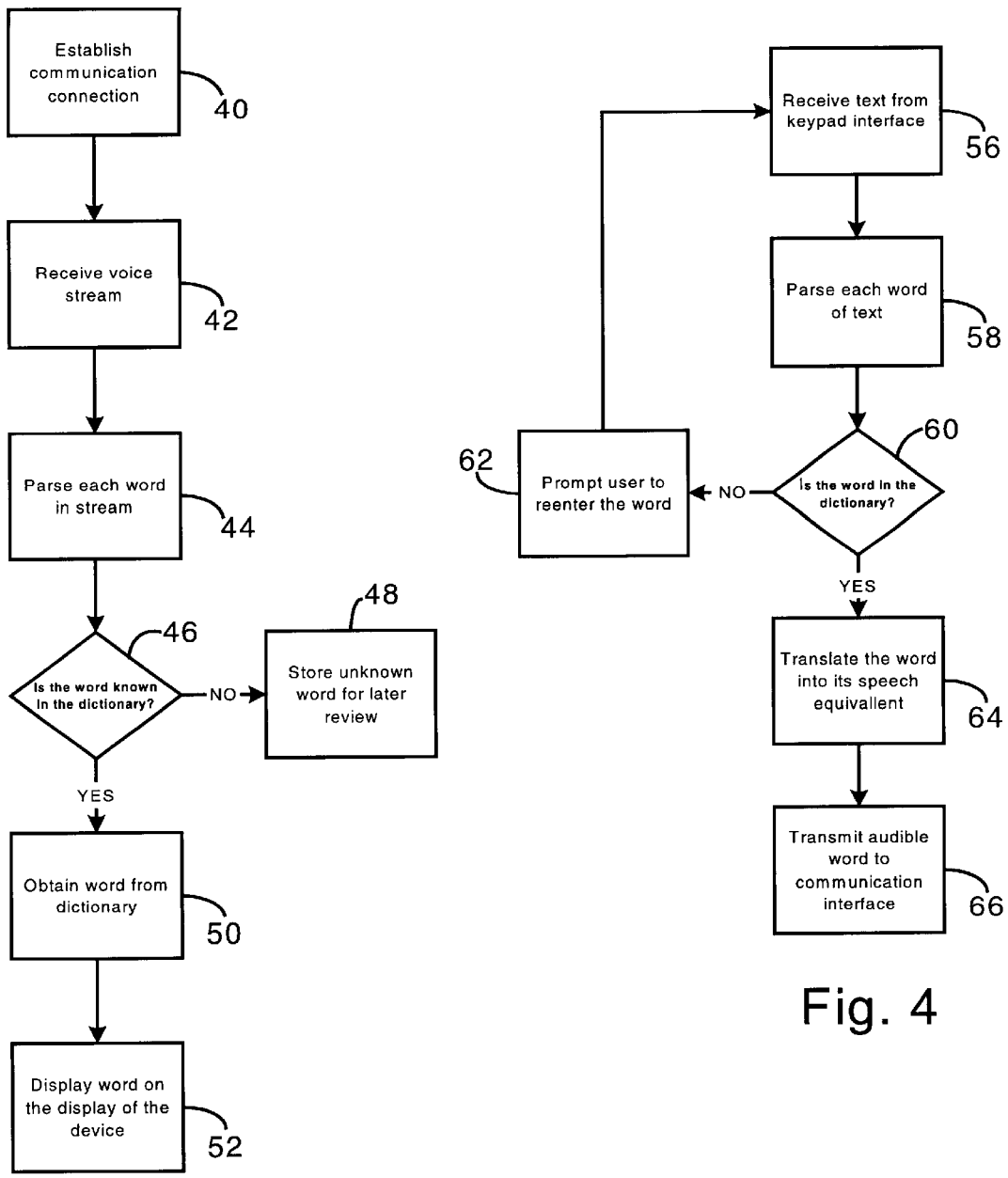

PORTABLE ELECTRONIC TELECOMMUNICATION DEVICE HAVING CAPABILITIES FOR THE HEARING-IMPAIRED

TECHNICAL FIELD

This invention relates generally to portable computer systems. More particularly, this invention relates to portable electronic telecommunication devices, such as cellular telephones, and other portable telecommunications computers that include displays and have computer platforms that can execute programs for speech-to-text translation.

BACKGROUND

For hearing-impaired persons to communicate though a voice communications pathway, they typically use desk-top computer units that either receive a communication data stream from the communicating party or translate the actual words spoken by the communicating party and display the text to the hearing-impaired person. The hearing-impaired person has the text of the speech displayed to them, and can then either talk back to the communicating party if they are able, or the hearing-impaired can also have a text-to-speech conversion device that allows the person to type in text and the device translates the text into audible speech. The communication data stream can contain information that is meant to be interpreted by the device of the hearing-impaired person, such as data in a "closed-captioned" format. The devices that allow this type of communication are quite large and typically are interconnected with a home telephone.

Moreover, computers such as home computers are often used to provide this interaction with telecommunications for the hearing-impaired. The home computer has a platform with software resident to interpret the speech or data stream and make the appropriate translation. The home computer can further include hardware and/or software to interpret the text input at the keyboard and translate the text into audible speech across the communication line.

In regard to speech-to-text conversion, there are several commercial software packages available that convert speech to text particularly for purposes of dictation and document generation. Examples of such software products that perform speech-to-text translation are "Dragon" and "Via Voice" of IBM.

Portable telecommunication devices, such as cellular telephones, do not typically include means for usage by the hearing-impaired. Thus, the hearing-impaired cannot enjoy the benefits of readily portable telecommunications devices as they have no way to at least receive the speech communications from the communicating (calling) party.

Therefore, it would be advantageous to provide a portable electronic telecommunication device that can use existing software and products to allow a hearing-impaired person to use the device to communicate.

BRIEF DESCRIPTION OF THE DRAWINGS

FIG. 3 is a flowchart illustrating the cellular telephone receiving speech through a communication link with a communicating party and then translating the speech into text.

FIG. 4 is a flowchart illustrating text input at the keypad interface being translated into audible speech and sent to the communicating party.

DETAILED DESCRIPTION OF THE INVENTION

Figure 1:
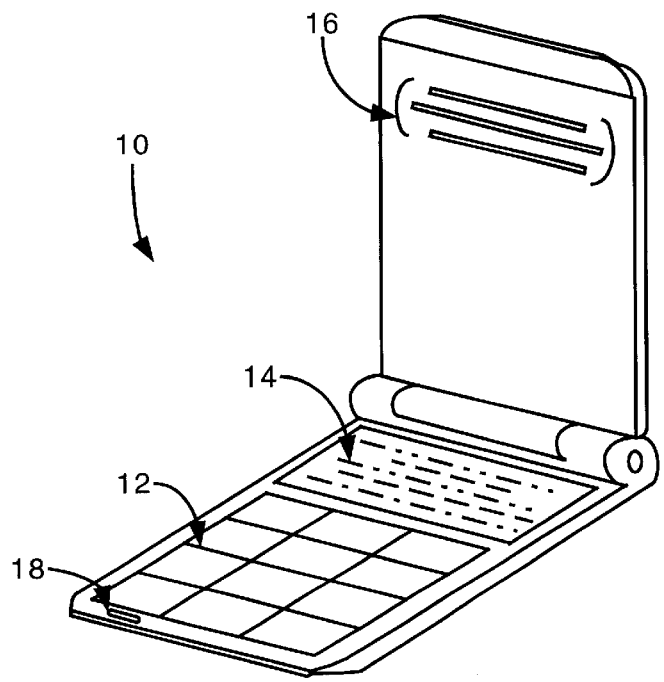
FIG. 1 is a perspective view of the portable electronic telecommunication device embodied as a cellular telephone.

A preferred embodiment of the invention is now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on."

Referring now to FIG. 1, illustrated therein is a portable electronic telecommunication device embodied as a cellular telephone 10 which has text-to-speech and speech-to-text translation capabilities so that it can be used by a hearing-impaired user. The cellular telephone 10 includes a keypad 12 having an electronic keypad interface, and a graphic display 14 that can display alphanumeric text and other graphics to the user of the cellular telephone 10 as well as others who can view the display 14. The cellular telephone 10 further has one or more speaker apertures 16 that provide audio access to a speaker which is typically placed next to the user's ear during conversation, and a microphone aperture 18 which provides audio access to a microphone such that the user can speak into the aperture 18 and the microphone converts the speech into electronic signals for transmission from the cellular telephone 10.

Figure 2:
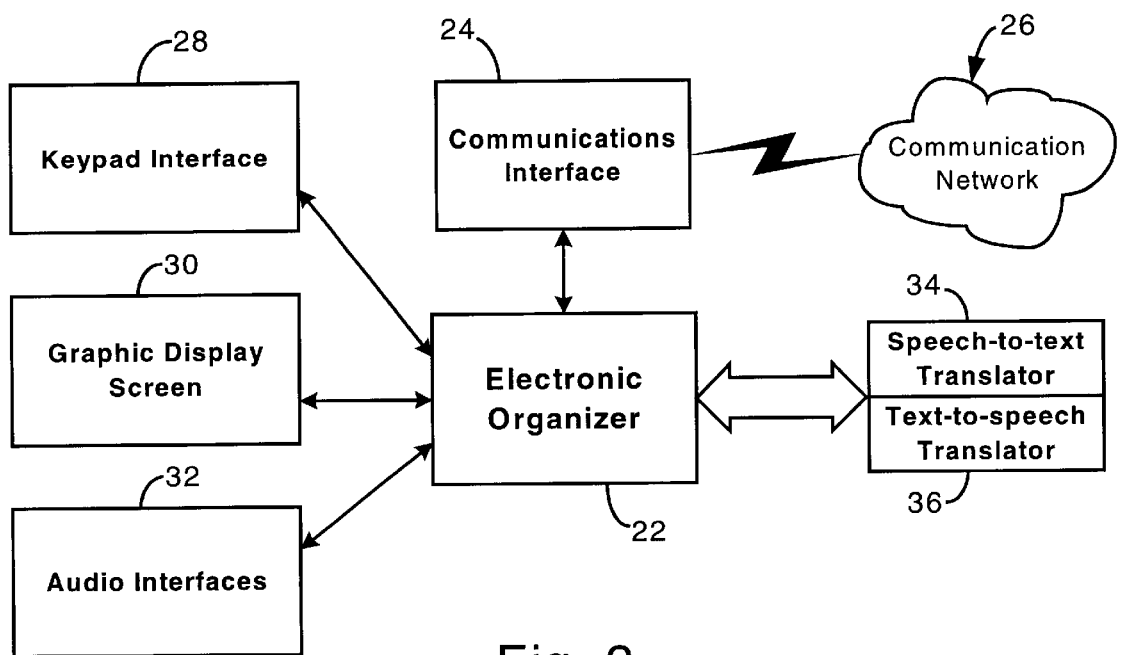
FIG. 2 is a block diagram of the electronic organizer of the cellular telephone being a computer platform and interacting with the other components of the cellular telephone.

The cellular telephone 10 also may have a computer platform in the form of an electronic organizer 22, as shown in FIG. 2, that can interface with some or all of the other components of the cellular telephone 10. Any cellular telephone or other portable electronic telecommunication device, such as personal digital assistants, that are well known in the art can be used in the present invention as long as the computer platform has the requisite software processing capability as is further described herein.

The electronic organizer 22 of the cellular telephone 10 and its interaction with the other components is particularly shown in FIG. 2. The electronic organizer 22 has storage for one or more programs and interacts with the various components of the cellular telephone 10. The electronic organizer 22 particularly interfaces with the communications interface 24 that ultimately receives and transmits communication data to a communication network 26, such as a cellular network or a broadcast wide area network (WAN). The electronic organizer 22 may interface with the keypad interface 28, the graphic display 30, and the audio interfaces 32. The keypad interface 28 may receive and interpret the input from the keys of the keypad 12 of the cellular telephone 10. The graphic display screen 30 displays alphanumeric text and other graphics on the display 14 of the cellular phone 10, and displays the text of the translated speech of the communicating party to the hearing-impaired user. The audio interfaces 32 are electronic interfaces for the physical components of the speaker and microphone (behind respective apertures 16 and 18 on cellular phone 10), each translating electronic signals either from or to audible speech.

The electronic organizer 22 may include the speech recognition translator program module 34 resident and selectively executable thereupon, and when called, the program module 34 translates speech from either the communicating party or the user of the telephone into a data stream of text comprised of text words ideally for each spoken word. The process of the speech translation is particularly shown in FIG. 3. There is also a text-to-speech translator program module 36 that is resident on the electronic organizer 22, and the program module 36 translates text input from the keypad interface 28 into speech though the process shown in the flowchart of FIG. 4, as is further discussed herein. The electronic organizer can further have additional program modules that allow the cellular telephone 10 to receive communication data streams from the communication network 26 and the communications interface 24 and display the text of the information from the communication data stream on the graphic display 14 with graphic display screen control 30. The communication data stream can be in known formats such as closed-captioning or other data formats commonly used by the devices of the hearing impaired.

In use, the cellular telephone 10 can either make or receive calls and selectively activate the speech-to-text translator 34 or text-to-speech translator 36 on the electronic organizer 22 to have the communicating party receive either a speech or text stream from the user. Further, if the communicating party is a calling party, the call itself can prompt one of the translators to be executed at the connection of the incoming phone call. This is especially important to the hearing-impaired user as he or she cannot identify the source of the call, i.e. voice or data, immediately upon connecting the call.

With reference to FIG. 3, there is shown a flowchart illustrating the cellular telephone 10 receiving speech through a communication link from the communication network 26 with a communication party and then translating the speech into text. A communication connection is established between the cellular telephone 10 and a communicating party, as shown at step 40. The communication connection can be either making or receiving a call from the cellular telephone 10. If the communication connection has a voice stream being sent to the cellular telephone 10, then the electronic organizer 22 received the voice stream, as shown at step 42, and calls the speech-to-text translator 34. Each word in the voice stream is then parsed, as shown at step 44, and then a determination is made as to whether the parsed word is known a resident dictionary on the electronic organizer 22, as is shown at decision 46.

The term dictionary is simply a data store of the electronic signatures of words. To identify a word, the electronic signatures of each word are compared in the dictionary to determine the text equivalent. Other speech-to-text conversion programs such as Dragon and Via Voice can be used on the computer platform (here electronic organizer 22) as well.

Referring again to FIG. 3, if the word is not located in the dictionary, then the electronic organizer stores the word for later review, as shown at step 48. While the simple storage of the unknown word is not a necessary step, it is advantageous because the voice stream will continue to be processed and the continuity of conversation is not lost. The stored words can later be reviewed to determine if there was an error in interpretation or if the words are new and should be added to the dictionary. If the word is located after comparison in the dictionary, then the text word is obtained from the dictionary, as shown at step 50, and then the text word is sent to the graphic display screen control 30 and ultimately displayed on the graphic display 14 of the cellular telephone 10, as is shown at step 52. If sufficient memory is present in the electronic organizer, the entire text from the communication can be saved and selectively recalled.

With reference to FIG. 4, there is shown a flowchart illustrating text input at the keypad 12 and is interpreted by the keypad interface 28 being translated into audible speech and sent to the communicating party. The text being typed by the user is received at the electronic organizer 22 from the keypad interface 28, as shown at step 56. The electronic organizer 22 calls the text-to-speech translator 36 and then each word of text is parsed, as shown at step 58.

A decision is made as to whether the parsed word is in the dictionary, as shown by decision 60, and if not, the user is prompted to reenter the word, as shown by step 63. Then control of the executing text-to-speech translator 34 is returned to step 56 so that the electronic organizer 22 waits until it receives the reentered word. If the text word is recognized at decision 60, then the text word is translated to is speech equivalent, as shown at step 64, and the electronic signal to create the audible word from the textual word is sent to the communication interface 24, as shown at step 66. There are several software programs in the art which can generate the electronic signals to speakers that can recreate speech sufficient to audibly communicate words.

Figure 5:
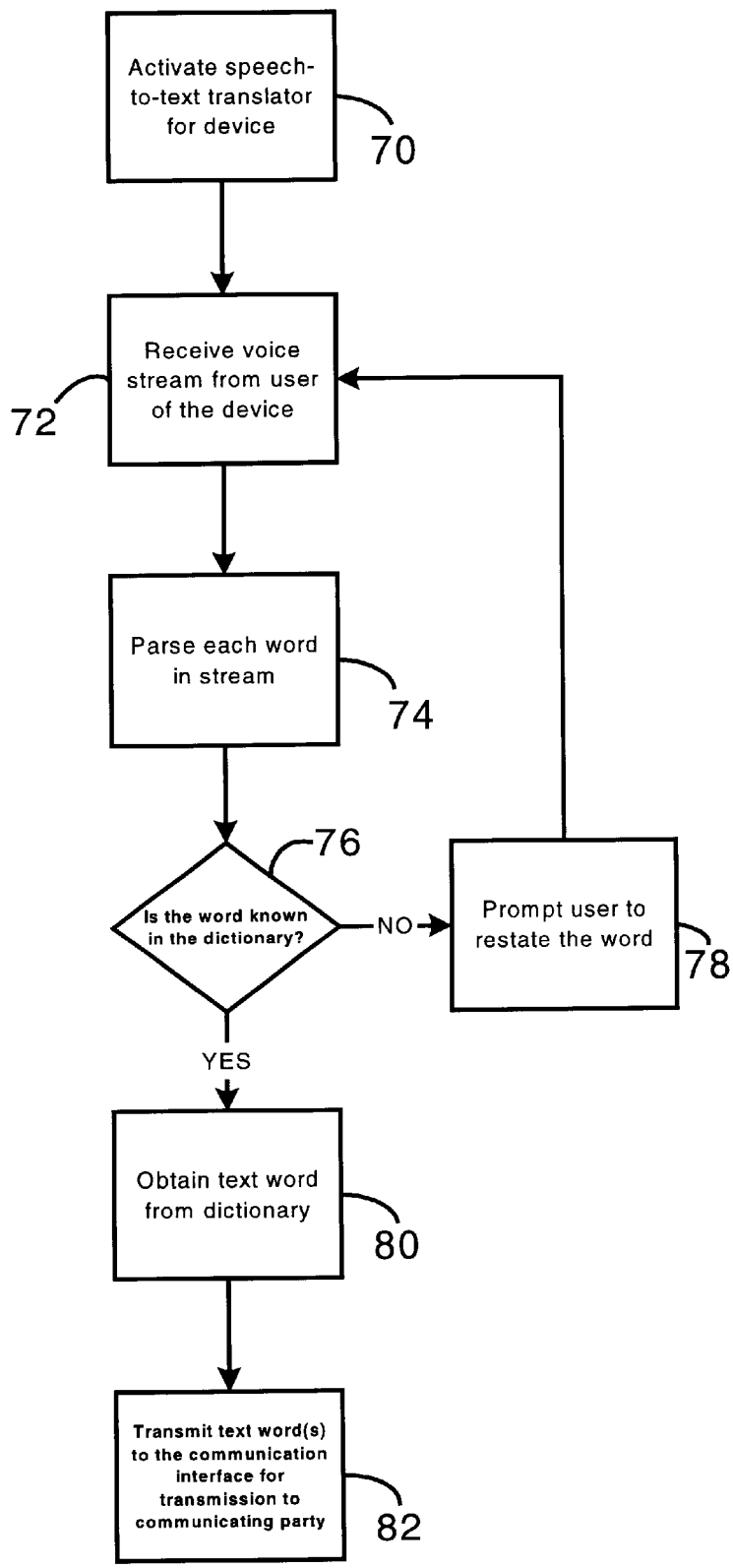
FIG. 5 is a flowchart illustrating speech from the user being translated into text data and being sent to the communicating party.

FIG. 5 illustrates a flowchart for the process of translation of speech from the user of the cellular telephone 10 into text data and, the text data sent to the communicating party. The speech-to-text translator 34 is activated on the electronic organizer 22, as shown in step 70, and then the voice stream is received in electronic form at the electronic organizer 22 from the audio interface 32 for the microphone. Each word in the voice stream is parsed, as shown at step 74, and then a decision is made as to whether the word is known in the dictionary, as shown at decision 76.

If the word is not known (i.e. located) then the user is prompted to restate the word, either at the display 14 or audibly at the speaker (through speaker apertures 16), as shown at step 78. Then the program returns to step 72 to one again receive the word spoken by the user. If the word is known in the dictionary, then the textual equivalent of the word is obtained from the dictionary, as shown at step 80, and the text is transmitted to the communication interface 24 for ultimate transmission across the communication network 26 to the communicating party, as shown at step 82.

While the preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims. For example, while one preferred embodiment is a cellular telephone, the invention could equally be applied to two-way radios, two-way pagers, and the like.

What is claimed is:

1. A cellular telephone having capabilities for use by a hearing-impaired user, comprising:
    a computer platform having storage for one or more programs;
    a display for displaying at least alphanumeric text; and
    a speech recognition program resident and selectively executable on the computer platform, whereupon establishing a communication connection with a communicating party, the speech recognition software interpreting the words of the communicating party and displaying the equivalent text on the display;
    wherein the speech recognition program comprises an electronic dictionary, wherein the electronic dictionary identifies a word by comparing an electronic signature of the word to a plurality of electronic signatures stored in the electronic dictionary.

2. The device of claim 1, further comprising a text entry device for the user of the device to input text for translation into synthetic speech for transmission to the communicating party.

3. The device of claim 1, wherein the speech recognition program further interprets the words of the user of the device and translates the words into text for transmission to the communicating party in an electronic format.

4. The device of claim 1, wherein:
   the computer platform is an electronic organizer of a cellular telephone; and
   the speech recognition program is resident in the electronic organizer and is selectively activated by the user of the device when communication is established.

5. The device of claim 1, further comprising a data recognition program resident and selectively executable on the computer platform, wherein the data recognition program receives and interprets a stream of communication data containing information from the communicating party and the data recognition program further displaying representative text of the information contained in the communication data on the display of the device.

6. The device of claim 1, wherein if the electronic signature of the word is not among the plurality of electronic signatures stored in the dictionary, the speech recognition program stores the word in the electronic dictionary for later review.

\* \* \* \* \*